No. 783,300. PATENTED FEB. 21, 1905.
P. McGRATH.
LEMON SQUEEZER.
APPLICATION FILED JUNE 25, 1904.
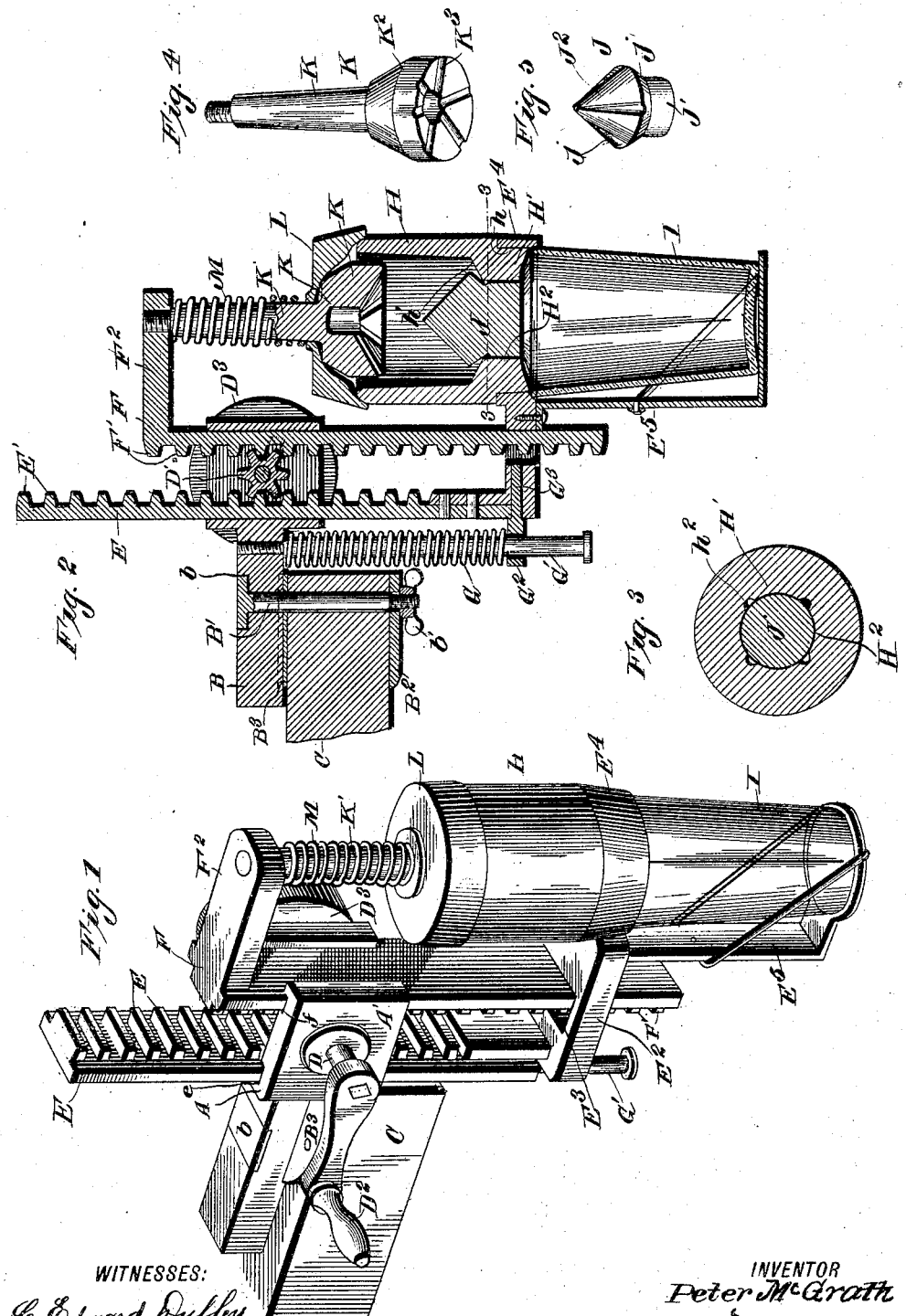
WITNESSES:
C. Edward Duffey
Perry B. Turpin.
INVENTOR
Peter McGrath
BY Munn & Co.
ATTORNEYS No. 783,300.

Patented February 21, 1905.

UNITED STATES PATENT OFFICE.

PETER McGRATH, OF HIBBING, MINNESOTA.

LEMON-SQUEEZER.

SPECIFICATION forming part of Letters Patent No. 783,300, dated February 21, 1905.

Application filed June 25, 1904. Serial No. 214,113.

*To all whom it may concern:*

Be it known that I, PETER McGRATH, a citizen of the United States, and a resident of Hibbing, in the county of St. Louis and State 5 of Minnesota, have made certain new and useful Improvements in Lemon-Squeezers, of which the following is a specification.

My invention is an improvement in lemon-squeezers; and it consists in certain novel constructions and combinations of parts, as will be hereinafter described and claimed.

In the drawings, Figure 1 is a perspective view of the lemon-squeezer. Fig. 2 is a vertical longitudinal section thereof. Fig. 3 is a detail cross-section through the cup and plug on about line 3 3 of Fig. 2. Fig. 4 is a detail perspective view of the plunger, and Fig. 5 is a detail perspective view of the plug.

In carrying out my invention I provide what for convenience of reference I call the "main frame" A, which has the top bar B, which may be secured in any suitable manner to a table C or other support. As shown, the bar B is perforated for the bolt B' and is recessed in its upper side at $b$ for the head of said bolt, and such bolt B' extends downwardly through an opening in the support C and receives the winged nut $b'$ on its lower end. By preference a wear-plate $B^2$ is arranged below the support C and a wear-plate $B^3$ above said support, the plate $B^3$ being preferably grooved, as will be understood from Figs. 1 and 2, to receive the bar B, so the latter will be held steadily in place when the nut $b'$ is tightened. The main frame A has the forwardly-projecting body portion, which is formed with the side plates A', having bearings for the main shaft D and are provided in their inner faces with the guideways $e$ for the cup-slide E and the guideways $f$ for the plunger-slide F. These guideways $e$ and $f$ are arranged on opposite sides of the shaft D, so the pinion D' of said shaft may mesh with the racks E' and F' of the slides E and F and operate the said slides reciprocally in the use of the invention. The shaft D has a handle $D^2$ at one end and a suitable balance or fly wheel $D^3$ at the other end and when turned in either direction operates to force one of the slides up and the other down, so that in the operation of squeezing the lemon the cup-slide may be forced upwardly and the plunger-slide downwardly to secure a double pressing action, and consequently a quick squeezing of the lemon.

After the lemon has been squeezed the parts are returned to normal position by a readjusting-spring G, which encircles a rod G', which depends from the main frame immediately in rear of the body portion thereof and extends downwardly through an eye $G^2$, whose shank $G^3$ is fitted in an opening in the lower end of the cup-slide E. It will be noticed that the spring G, bearing between the main frame and the eye $G^2$, tends to force the cup-slide E downwardly, and such spring G is put under tension by the upward movement of the cup-slide in the squeezing operation.

At its lower end the cup-slide is provided with a forwardly-projecting wing $E^2$, having a guide-opening $E^3$, in which is guided the lower end of the plunger-slide F, and also having in advance of the guide-opening $E^3$ a ring-like holder $E^4$ for the cup H, which is carried by the said cup-slide. The wing $E^2$ also supports a glass-holding frame $E^5$, adapted to support any suitable glass I below the cup H and in position to receive the juice squeezed from the lemon. The cup H and its plug J are preferably made of glass and are separable, so they can be readily detached for the purpose of cleansing. The cup H is preferably tapered upwardly on its inner side to facilitate the introduction of the plunger and is rabbeted on its outer side at its lower end at $h$ to fit in the ring-like holder $E^4$, as will be understood from Figs. 1 and 2 of the drawings. The bottom H' of the cup is tapered downwardly on its upper side at $h'$ toward a central opening $H^2$, in which fits the depending portion or shank J' of the plug J. The walls of the opening $H^2$ are grooved longitudinally at $h^2$ for the passage of the juice expressed by the operation of the plunger presently described. The plug J has its upper end or head $J^2$ sloped downwardly on its upper side and is grooved at $j$ in such upper side for the passage of the lemon-juice and has the under side of said head at J' formed at a more acute angle than the upper surface $h'$ of the bottom H', so that the head J² overlaps the inclined surface $h'$ and forms a shed extending over the upper ends of the grooves $h^2$ and preventing seed from passing directly to the said grooves $h^2$, as will be understood from Fig. 2 of the drawings.

The plunger-slide F is provided at its upper end with the forwardly-projecting wing F², from which depends the plunger K, whose shank K' is secured in its upper end in any suitable manner to the wing F², the plunger-rod K² being adapted to operate within the cup H and being grooved on its under side at K³ to better operate in expressing the juice of the lemon. The plunger K carries a cover L for the cup H, a spring M encircling the shank K' of the plunger and bearing between the wing F² and the upper side of the cover L to press the same firmly upon the cup H.

In the operation of my invention it will be understood that if the shaft D be turned in the proper direction the plunger and the cover L will be forced downwardly into and upon the cup H, while the cup and its plug will be forced upwardly by the same action toward the plunger, the reciprocal action facilitating the pressing of the juice from the lemon. After the pressing operation if the handle D² of the shaft be released the spring G will readjust the parts to position for a new operation.

Having thus described my invention, what I claim as new, and desire to secure by Letters Patent, is—

1. The lemon-squeezer herein described comprising a main frame having guides for cup and plunger slides and bearings for the main shaft, a main shaft journaled in said bearings and having a pinion to mesh with racks on cup and plunger slides, a cup-slide having an upright portion provided with a rack-bar meshed with the pinion of the main shaft and provided at its lower end with a forwardly-projecting wing having a guideway for a plunger-slide and in advance thereof a cup-holder, a readjusting-spring bearing between the cup-slide and the main frame, a cup seated in the holder of the cup-slide and having its bottom provided with a discharge-opening grooved longitudinally, a plug having a shank fitted in said grooved discharge-opening and provided at its upper end with a head whose upper side is grooved for the passage of the juice and whose under side is inclined at a more acute angle than the bottom and overlaps the same, a plunger-slide guided at its upper end in the guideways of the main frame and at its lower end in the guideways of the cup-slide and provided at its upper end with a forwardly-projecting wing, a plunger having its shank secured to and depending from said wing, a cover for the cup, such cover being slidable on the shank of the plunger, and a spring bearing between such cover and the plunger-slide all substantially as and for the purposes set forth.

2. The combination in a lemon-squeezer, of a main frame having guideways for cup and plunger slides, cup and plunger slides movable in said guideways, and provided with an opposing cup and plunger adapted to operate upon lemons, and means for operating the cup and plunger slides reciprocally substantially as set forth.

3. The combination in a lemon-squeezer of a main frame, cup and plunger slides movable reciprocally in said main frame, means for giving such slides an operating movement, a rod on the main frame and forming a supplemental guide for one of the slides, and a spring on said rod for readjusting the slides substantially as set forth.

4. The combination of the main frame having guides for cup and plunger slides, a cup-slide movable in said frame and having at its lower end a forwardly-projecting wing, a cup supported on said wing, a plunger-slide movable in the main frame and having at its upper end a forwardly-projecting wing, a plunger supported by said wing and means for operating the slides reciprocally, substantially as set forth.

5. The combination of the main frame, a cup-slide movable in the main frame, a readjusting-spring bearing between the cup-slide and the main frame, a plunger-slide movable in the main frame, and operating-gearing between the two slides whereby they may be moved reciprocally substantially as set forth.

6. In a lemon-squeezer, the combination with the cup having its bottom provided with a discharge-opening, grooved longitudinally, of the plug having a depending shank or portion fitting in said grooved discharge-opening and a head which overlaps the upper end of the discharge-opening and has its under side formed at a more acute angle than that of the upper side of the bottom substantially as set forth.

7. In a lemon-squeezer a cup having its bottom provided with a discharge-opening grooved longitudinally and the upper side of such bottom inclining downwardly toward the discharge-opening and the plug having a depending shank or portion fitting in the grooved discharge-opening substantially as set forth.

8. In a lemon-squeezer the combination of a cup having its bottom provided with a discharge-opening and a plug having a head overlying the bottom of the cup and a depending shank or portion fitting in the discharge-opening in the bottom of the cup substantially as set forth.

9. The herein-described improvement in lemon-squeezers comprising a main frame having guideways for cup and plunger slides, cup and plunger slides movable in said guideways and having rack-teeth for engagement by the operating-pinion, and an operating-pinion between and meshed with said cup and plunger slides whereby to operate the same in opposite directions as the pinion is turned, and an alined cup and plunger on their respective slides.

PETER McGRATH.

Witnesses:
ROBERT MAXWELL,
S. LEKOE.